(12) United States Patent
Döring et al.

(10) Patent No.: US 10,876,449 B2
(45) Date of Patent: Dec. 29, 2020

(54) INTERNAL COMBUSTION ENGINE AND METHOD FOR OPERATING SAME

(71) Applicant: MAN DIESEL & TURBO SE, Augsburg (DE)

(72) Inventors: Andreas Döring, Munich/Unterhaching (DE); Plamen Toshev, Augsburg (DE)

(73) Assignee: MAN Energy Solutions SE, Augsburg (DE)

( * ) Notice: Subject to any disclaimer, the term of this patent is extended or adjusted under 35 U.S.C. 154(b) by 177 days.

(21) Appl. No.: 15/548,298

(22) PCT Filed: Feb. 4, 2016

(86) PCT No.: PCT/EP2016/000186
§ 371 (c)(1),
(2) Date: Aug. 2, 2017

(87) PCT Pub. No.: WO2016/124337
PCT Pub. Date: Aug. 11, 2016

(65) Prior Publication Data
US 2018/0010500 A1 Jan. 11, 2018

(30) Foreign Application Priority Data

Feb. 5, 2015 (DE) .................. 10 2015 001 495

(51) Int. Cl.
*F01N 3/10* (2006.01)
*F01N 3/20* (2006.01)
(Continued)

(52) U.S. Cl.
CPC ............ *F01N 3/106* (2013.01); *F01N 3/103* (2013.01); *F01N 3/208* (2013.01); *F01N 3/2066* (2013.01);
(Continued)

(58) Field of Classification Search
CPC combination set(s) only.
See application file for complete search history.

(56) References Cited

U.S. PATENT DOCUMENTS 5,260,043 A * 11/1993 Li ..................... B01D 53/8625
423/239.2
5,524,432 A * 6/1996 Hansel ............... B01D 53/8625
60/274

(Continued)

FOREIGN PATENT DOCUMENTS

CA    2 543 031      4/2006
CN    103945920     7/2014
(Continued)

OTHER PUBLICATIONS

Office Action dated Sep. 17, 2018 issued in the corresponding Korean Patent Application No. 10-2017-7023043.
(Continued)

*Primary Examiner* — Binh Q Tran
(74) *Attorney, Agent, or Firm* — Cozen O'Connor

(57) ABSTRACT

Method for operating an internal combustion engine which has a gas combustion system and an exhaust gas post-treatment system. Exhaust gas that leaves the gas combustion system is directed to at least one CH4 oxidation catalytic converter of the exhaust gas post-treatment system. The CH4/NO2 mole ratio in the exhaust gas is set in a defined fashion by at least one gas-combustion-system-side and/or exhaust-gas-post-treatment-system-side measure upstream of at least one CH4 oxidation catalytic converter.

19 Claims, 5 Drawing Sheets

(51) Int. Cl.
  *F01N 13/00* (2010.01)
  *F02B 43/00* (2006.01)
(52) U.S. Cl.
  CPC ....... *F01N 13/009* (2014.06); *F01N 13/0093* (2014.06); *F01N 2430/06* (2013.01); *F01N 2430/08* (2013.01); *F01N 2560/026* (2013.01); *F01N 2570/12* (2013.01); *F01N 2570/14* (2013.01); *F01N 2610/02* (2013.01); *F01N 2900/0408* (2013.01); *F01N 2900/1402* (2013.01); *F02B 43/00* (2013.01); *Y02T 10/12* (2013.01)

(56) References Cited

U.S. PATENT DOCUMENTS

| | | | | |
|---|---|---|---|---|
| 5,947,063 | A * | 9/1999 | Smith | B01D 53/9454 123/3 |
| 9,453,465 | B2 * | 9/2016 | Bidner | F02M 26/36 |
| 2006/0105902 | A1 * | 5/2006 | Pieterse | B01D 53/8628 502/60 |
| 2010/0083635 | A1 * | 4/2010 | Kitaura | F01N 3/10 60/276 |
| 2013/0192203 | A1 * | 8/2013 | Zemskova | F01N 3/106 60/274 |
| 2014/0090374 | A1 * | 4/2014 | Chavannavar | F01N 3/035 60/605.2 |
| 2014/0322119 | A1 | 10/2014 | Chen et al. | |
| 2016/0222896 | A1 | 8/2016 | Hotta et al. | |

FOREIGN PATENT DOCUMENTS

| | | |
|---|---|---|
| DE | 10 2007 053130 | 5/2009 |
| DE | 112013005070 | 8/2015 |
| EP | 3018314 | 5/2016 |
| JP | 2015-502845 | 1/2015 |
| KR | 101022018 B1 | 3/2011 |
| KR | 20140110863 | 9/2014 |
| WO | WO 2010/147071 | 12/2010 |
| WO | WO 2013/074147 | 5/2013 |
| WO | WO 2014/060987 | 4/2014 |
| WO | WO 2015/001647 | 1/2015 |

OTHER PUBLICATIONS

Office Action dated May 22, 2018 which issued in the corresponding Canadian Patent Application No. 2,973,157.

Office Action dated May 7, 2018 which issued in the corresponding Japanese Patent Application No. 2017-536280.

* cited by examiner

INTERNAL COMBUSTION ENGINE AND METHOD FOR OPERATING SAME

CROSS REFERENCE TO RELATED APPLICATION

This is a U.S. national stage of application No. PCT/EP2016/000186, filed on Feb. 4, 2016. Priority is claimed on German Application No. DE102015001495.1, filed Feb. 5, 2015, the content of which is incorporated here by reference.

BACKGROUND OF THE INVENTION

1. Field of the Invention

The invention relates to a method for operating an internal combustion engine having a gas combustion system and an exhaust gas aftertreatment system. The invention, furthermore, relates to an internal combustion engine having a gas combustion system and an exhaust gas aftertreatment system.

2. Description of the Prior Art

From practice, internal combustion engines are known that combust a gaseous fuel, such as for example natural gas. Such internal combustion engines can for example be reciprocating piston internal combustion engines or turbomachines such as gas turbines. Accordingly, internal combustion engines are known for example from shipbuilding, which combust natural gas and for this purpose comprise a gas engine as a gas combustion system. Furthermore, such internal combustion engines comprise an exhaust gas aftertreatment system to clean the exhaust gas leaving the gas combustion system. In the case of internal combustion engines that combust natural gas, undesirable emissions of $CH_4$ (methane) can occur because of an incomplete combustion of the natural gas. Since methane constitutes a powerful greenhouse gas, the emission of methane into the environment has to be minimized. In the case of internal combustion engines known from practice, which combust for example natural gas, the respective exhaust gas aftertreatment systems comprise catalytic converters in order to decompose $CH_4$. According to practice, catalytic converters are employed there which catalytically active substance comprise in particular metal of the platinum metal group such as for example platinum and/or palladium, wherein the charging of such a $CH_4$ decomposition catalytic converter with a metal of the platinum metal group typically amounts to over 7 grams of precious metal per litre of catalytic converter volume. This causes high costs. Furthermore, the operating period of such catalytic converters is relatively low since the same can be deactivated by way of sulphur oxides which can enter the exhaust gas aftertreatment system via the fuel and/or via engine oil.

In the case of internal combustion engines known from practice, which combust a gaseous fuel, the possibility for the reduction of $CH_4$ emissions is accordingly limited. There is therefore a need for a new type of internal combustion engine and for a method for operating such an internal combustion engine, with which $CH_4$ emissions can be reduced to a greater extent.

SUMMARY OF THE INVENTION

Starting out from this, one aspect of the present invention is based on creating a method for operating an internal combustion engine which comprises a gas combustion system and an exhaust gas aftertreatment system and a corresponding internal combustion engine.

According to one aspect of the invention, the exhaust gas is conducted via a $CH_4$-oxidation catalytic converter of the exhaust gas aftertreatment system, wherein the $NO_2$ proportion in the exhaust gas is adjusted in a defined manner by at least one measure on the gas combustion system side and/or measure on the exhaust gas aftertreatment system side upstream of at least one $CH_4$-oxidation catalytic converter. By way of the adjustment of the $NO_2$ proportion in the exhaust gas upstream of the or each $CH_4$-oxidation catalytic converter the decomposition of $CH_4$ can be improved as a result of which it is possible to reduce $CH_4$ emissions of an internal combustion engine.

Preferentially, the $NO_2$ proportion in the exhaust gas is adjusted so that upstream of at least one of the $CH_4$-oxidation catalytic converters the $NO_2$ proportion in the total nitrogen oxides in the exhaust gas amounts to at least 15%, preferably at least 30%, particularly preferably at least 50%. Such an $NO_2$ proportion in the total nitrogen oxides in the exhaust gas is particularly advantageous for the effective reduction of $CH_4$ emissions in internal combustion engines which combust a gaseous fuel such as, for example, natural gas.

According to an advantageous further development, the $NO_2$ proportion in the exhaust gas is adjusted via at least one NO-oxidation catalytic converter of the exhaust gas aftertreatment system, which is arranged upstream of the or each $CH_4$-oxidation catalytic converter. By way of this, the $NO_2$ proportion in the exhaust gas can be easily adjusted by a measure on the exhaust gas aftertreatment system side.

According to a further advantageous development, the $NO_2$ proportion in the exhaust gas is adjusted by changing at least one operating parameter for the gas combustion system. By way of this, the $NO_2$ proportion in the exhaust gas can be particularly advantageously adjusted through a measure on the gas combustion system side.

Preferentially, the exhaust gas of the internal combustion engine is conducted via an SCR-catalytic converter downstream of the or each $CH_4$-oxidation catalytic converter, wherein in the exhaust gas downstream of the SCR-catalytic converter $NH_3$ or an $NH_3$ precursor substance is introduced. Following the decomposition of the $CH_4$ and accordingly the reduction of the $CH_4$ emissions, the emission of $NO_2$ can be lowered via the SCR-catalytic converter.

BRIEF DESCRIPTION OF THE DRAWINGS

Preferred further developments of the invention are obtained from the following description. Exemplary embodiments of the invention are explained in more detail by way of the drawing without being restricted to this. There it shows.

DETAILED DESCRIPTION OF THE PRESENTLY PREFERRED EMBODIMENTS

Figure 1:
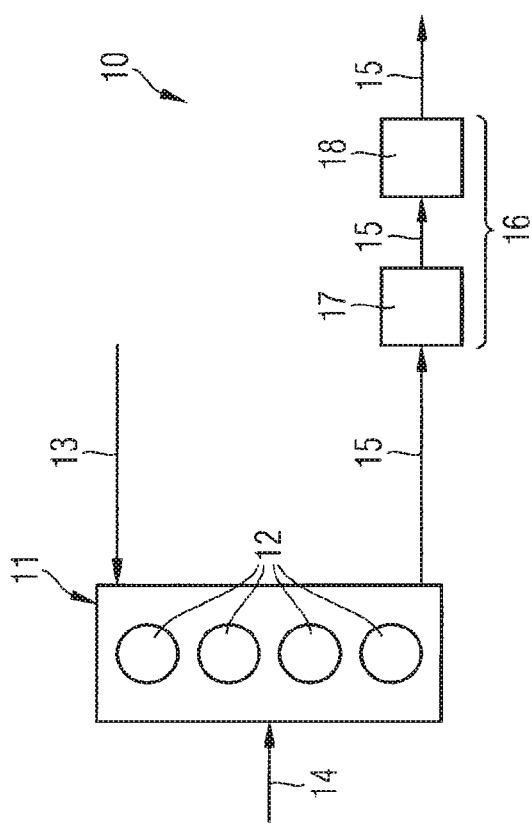
FIG. 1: is a schematic representation of an internal combustion engine according to the invention.

The invention relates to an internal combustion engine that comprises a gas combustion system and an exhaust gas aftertreatment system, and to a method for operating such an internal combustion engine.

Making reference to FIGS. 1 to 10, the invention is described in the following on the example of internal combustion engines 10, which as gas combustion system comprise a gas engine 11 with cylinders 12. The cylinders 12 are supplied with fuel, in particular natural gas and in addition to the gaseous fuel 14 combustion air 13 for combusting the same.

Exhaust gas 15 created in the process is discharged from the gas engine 11 and conducted via an exhaust gas aftertreatment system 16.

It is pointed out here that the invention is preferably employed with internal combustion engine utilising as gas combustion system a reciprocating piston gas engine or auto-cycle gas engine 12, but the same can also be employed with internal combustion engine the gas combustion system 11 of which is provided by a turbomachine such as for example a gas turbine.

A first exemplary embodiment of an internal combustion engine 10 is shown by FIG. 1, wherein in the exemplary embodiment of FIG. 1 the exhaust gas aftertreatment system 16 comprises a CH$_4$-oxidation catalytic converter 18 and upstream of the CH$_4$-oxidation catalytic converter 18 an NO-oxidation catalytic converter 17. Exhaust gas 15, which leaves the cylinders 12 of the gas engine 11 of the internal combustion engine 10 of FIG. 1, is initially conducted via the NO-oxidation catalytic converter 17 and subsequently via the CH$_4$-oxidation catalytic converter 18. With the help of the NO-oxidation catalytic converter 17 the NO$_2$ proportion in the exhaust gas 15 is adjusted in a defined manner through a measure on the exhaust gas aftertreatment system side, namely by way of conducting the exhaust gas 15 via the NO-oxidation catalytic converter 17. Because of this, a particularly effective CH$_4$ composition can then take place in the CH$_4$-oxidation catalytic converter 18, in particular when via the NO-oxidation catalytic converter 17 the NO$_2$ proportion in the exhaust gas 15 upstream of the CH$_4$-oxidation catalytic converter 18 is adjusted so that the NO$_2$ proportion in the exhaust gas in the total nitrogen oxides of the exhaust gas amounts to at least 15%, preferably at least 30%, particularly preferably at least 50%. As is described in detail below, the NO$_2$ proportion in the total nitrogen oxides in the exhaust gas 15 can, alternatively or additionally to such a measure on the exhaust gas aftertreatment system side, also be adjusted via a measure on the gas engine side.

The NO-oxidation catalytic converter 17 preferentially utilises as catalytically active substance a precious metal of the platinum metal group such as for example platinum and/or palladium, wherein the charge of the NO-oxidation catalytic converter 17 with this precious metal maximally amounts to 2.85 g/l of catalytic converter volume, preferably less than 2.5 g/l, particularly preferably less than 1.75 g/l.

In the NO-oxidation catalytic converter 17, nitrogen oxide is converted into nitrogen dioxide according to the following equation:

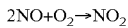

$$2NO+O_2 \rightarrow NO_2$$

Following this, the decomposition of CH$_4$ takes place in the CH$_4$-oxidation catalytic converter 18 according to the following reaction:

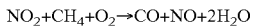

$$NO_2+CH_4+O_2 \rightarrow CO+NO+2H_2O$$

During the operation of the internal combustion engine 10, the ratio of the CH$_4$ to be decomposed to the total nitrogen oxides is adjusted so that the ratio CH$_4$/NO$_2$ is smaller than 2, preferably smaller than 1.5, even more preferably smaller than 1.

As already explained, the NO-oxidation catalytic converter 17 preferentially contains as catalytically active substance a precious metal such as platinum, in particular in a proportion between 0.5 gram (g)/litre of catalytic converter volume (l) and 2.85 g/l, preferably in a proportion between 0.5 g/l and 2.5 g/l, most preferably between 0.5 g/l and 1.75 g/l.

As washcoat material, such an NO-oxidation catalytic converter 17 preferentially contains Al$_2$O$_3$ and/or TiO$_2$.

In the CH$_4$-oxidation catalytic converter 18, cerium, and/or cobalt, and/or copper, and/or iron are preferentially employed as active components. These are preferentially incorporated in a zeolite matrix of the structures MOR, FER, PER, MFI (ZSME-5), LTL, LAU, CHI, or CHA.

Figure 2:
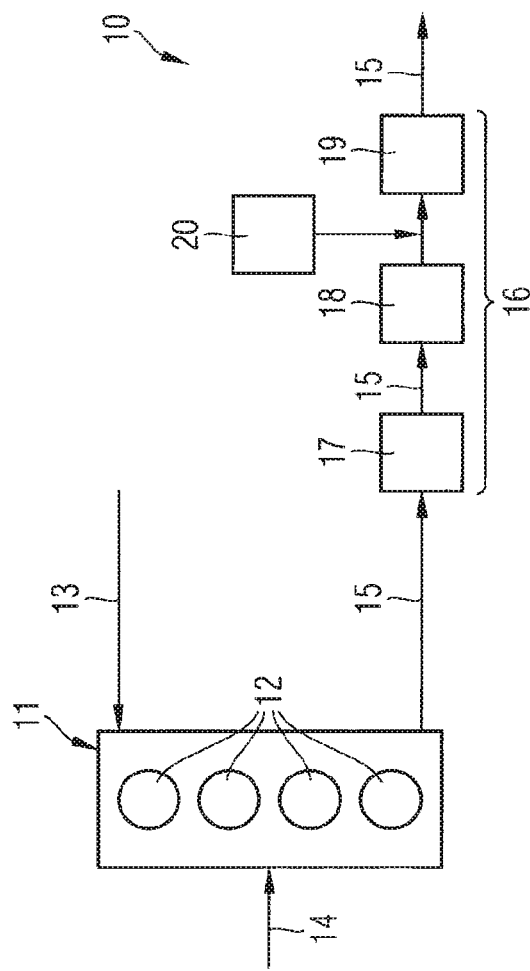
FIG. 2: is a schematic representation of an internal combustion engine according to the invention.

A further development of the internal combustion engine 10 of FIG. 1 is shown by FIG. 2, wherein the internal combustion engine 10 of FIG. 2 differs from the internal combustion engine 10 of FIG. 1 in that the exhaust gas aftertreatment system 16 of the same comprises: downstream of the CH$_4$-oxidation catalytic converter 18, an SCR-catalytic converter 19 that serves for the reduction of NO$_2$ emissions. Upstream of the SCR-catalytic converter 19 a device 20 is positioned, via which the NH$_3$ (ammonia) or an NH$_3$ precursor substance, such as for example urea, can be introduced into the exhaust gas 15 upstream of the SCR-catalytic converter 19. In the SCR-catalytic converter 19, ammonia serves as reduction agent for reducing the nitrogen oxides.

In particular when in the exhaust gas an NH$_3$ precursor substance such as for example urea is introduced, the urea is converted in the exhaust gas into NH$_3$, typically according to the following reaction equation:

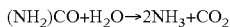

$$(NH_2)CO+H_2O \rightarrow 2NH_3+CO_2$$

Since the conversion of urea into NH$_3$ according to the above reaction equation is typically successful effectively only at exhaust gas temperatures in the order of magnitude of 450° C., a hydrolysis catalytic converter can be utilised upstream of the SCR-catalytic converter 19 in order to support the conversion of the ammonia precursor substance, such as for example urea, into NH$_3$.

In hydrolysis catalytic converters, the conversion of urea into NH$_3$ typically takes place according to the following reaction equations:

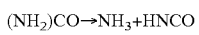

$$(NH_2)CO \rightarrow NH_3+HNCO$$

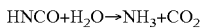

$$HNCO+H_2O \rightarrow NH_3+CO_2$$

The conversion of nitrogen oxides in the SCR-catalytic converter 19 using NH$_3$ as reduction agent takes place according to the following reaction equations:

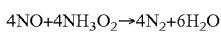

$$4NO+4NH_3O_2 \rightarrow 4N_2+6H_2O$$

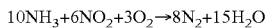

$$10NH_3+6NO_2+3O_2 \rightarrow 8N_2+15H_2O$$

As SCR-catalytic converters 19, $V_2O_5$-containing SCR-catalytic converters 19 can be used, which contain for example $V_2O_5/WO_3/TiO_2$ mixed oxides as active components. Typical $V_2O_5$ proportions in SCR-catalytic converters 19 lie between 0.2%-3%. As active components, the SCR-catalytic converters 19 can also utilise $TiO_2$ and/or $SiO_2$ and/or $Al_2O_3$ and/or zeolite.

At high exhaust gas temperatures, the use of $V_2O_5$ as SCR active component proves to be critical. The reason for this lies in the low thermal stability. Accordingly, the sublimation of $V_2O_5$ occurs at an exhaust gas temperature above 650° C. For these high temperature applications, $V_2O_5$-free, transition metal-containing, in particular iron, cobalt or copper-containing SCR-catalytic converters 19 are employed. In this connection, it has proved to be particularly advantageous to integrate these transition metals by way of iron exchange in zeolites. Because of the very large surface area of the zeolites, a substantial enlargement of the active surface and thus a significant increase of the SCR conversions can be successfully achieved.

Figure 3:
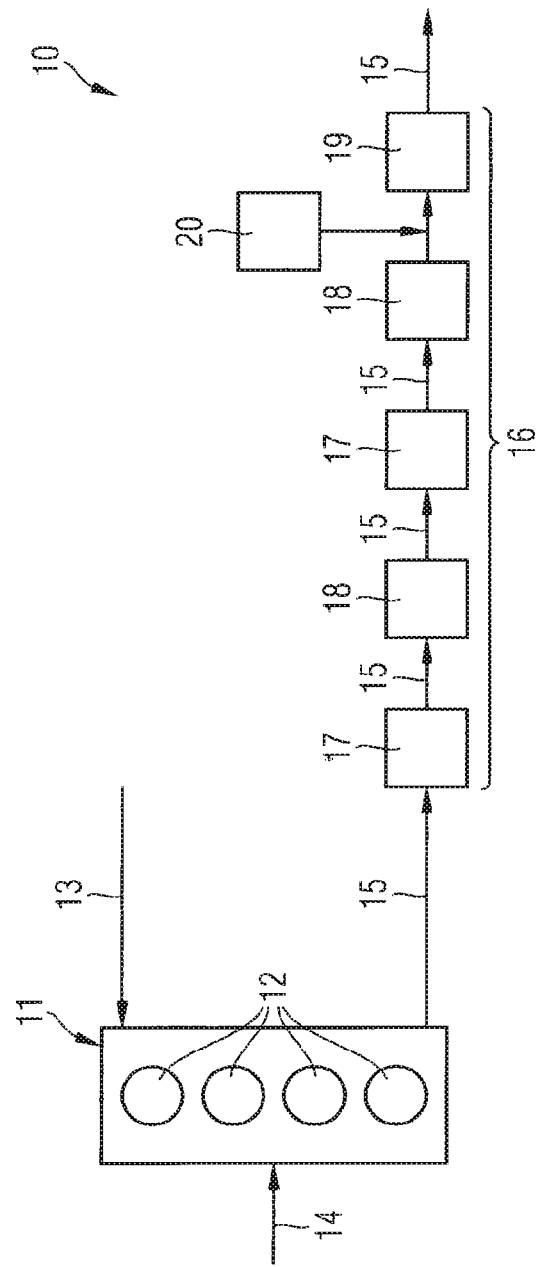
FIG. 3: is a schematic representation of in internal combustion engine according to the invention.

A further development of the internal combustion engine 10 of FIG. 2 is shown by FIG. 3, wherein the internal combustion engine 10 of FIG. 3 differs from the internal combustion engine 10 of FIG. 2 in that the exhaust gas aftertreatment system 16 of the internal combustion engine 10 of FIG. 3 comprises a plurality of NO-oxidation catalytic converters 17 and a plurality of $CH_4$-oxidation catalytic converters 18.

Accordingly, a first $CH_4$-oxidation catalytic converter 18 is present downstream of a first NO-oxidation catalytic converter 17 and a second NO-oxidation catalytic converter 17 downstream of the first $CH_4$-oxidation catalytic converter 18 with a second $CH_4$-oxidation catalytic converter 18 arranged downstream of the second NO-oxidation catalytic converter 17. Through the embodiment, the $NO_2$ reduced in the $CH_4$-oxidation catalytic converter 18 is re-oxidised into $NO_2$ and is thus again available on the second $CH_4$-oxidation catalytic converter connected downstream.

By way of such multi-stage oxidation of $CH_4$, $CH_4$ emissions can be advantageously lowered further. Here it is advantageous to utilise an NO-oxidation catalytic converter 17 upstream of each $CH_4$-oxidation catalytic converter in order to adjust a defined $NO_2$ proportion in the total nitrogen oxides in the exhaust gas 15 upstream of each $CH_4$-oxidation catalytic converter 18.

The alternating sequence of NO-oxidation catalytic converters and $CH_4$-oxidation catalytic converters can be realised via separate catalytic converter carriers or a common catalytic converter carrier, as the same in the latter case form a structural unit. In the case of honeycomb catalytic converters, NO-oxidation catalytic converters and $CH_4$-oxidation catalytic converters can be alternatingly arranged over the duct circumference.

The exemplary embodiments of FIGS. 1 to 3 have in common that the $NO_2$ proportion in the total nitrogen oxides in the exhaust gas 15 upstream of the respective $CH_4$-oxidation catalytic converter 18 is adjusted in a defined manner via a measure on the exhaust gas aftertreatment system side.

Figure 4:
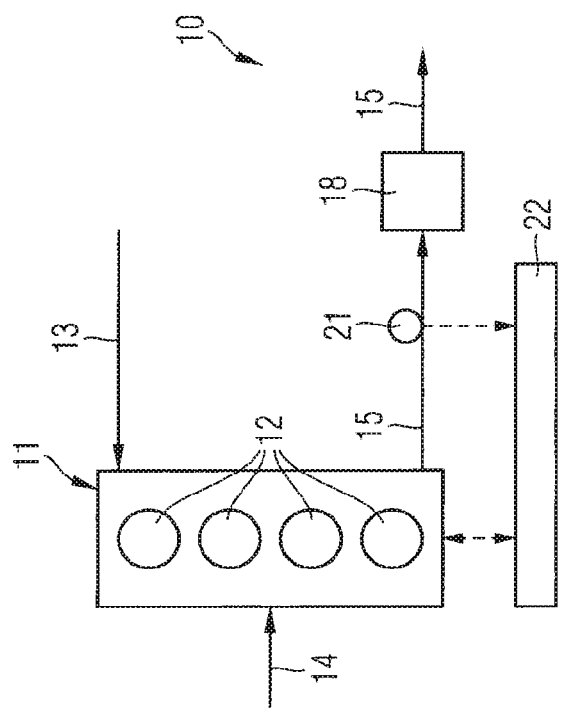
FIG. 4: is a schematic representation of an internal combustion engine according to the invention.

FIG. 4 shows an exemplary embodiment of an internal combustion engine 10, in which the $NO_2$ proportion in the exhaust gas 15 upstream of the $CH_4$-oxidation catalytic converter 18 is adjusted in a defined manner by way of a measure on the gas combustion system side, namely a measure on the gas engine side, namely preferentially again in such a manner that the $NO_2$ proportion in the total nitrogen oxides in the exhaust gas 15 amounts to at least 15%, preferably at least 30%, particularly preferably at least 50%. To this end, preferentially at least one operating parameter of the gas engine 11 is adapted, in particular a lambda value and/or an ignition timing and/or valve control times and/or an engine compression and/or an exhaust gas proportion in the engine combustion chamber.

In particular when the lambda value is reduced, the $NO_2$ proportion in the exhaust gas rises generally. Furthermore, by shifting the ignition timing in the direction of advanced timing and/or by increasing the exhaust gas proportion in the engine combustion chamber the $NO_2$ proportion in the exhaust gas can be generally increased. It is possible, furthermore, by retarded opening of inlet valves of the cylinders 12 and by retarded closing of exhaust valves of the cylinders 12 to increase the $NO_2$ proportion in the exhaust gas. By increasing the engine compression, the $NO_2$ proportion in the exhaust gas is generally reduced.

In order to be able to specifically adjust the $NO_2$ proportion in the exhaust gas 15 via a measure on the gas engine side, an $NO_2$ exhaust gas actual value is determined in the exhaust gas 15 with the help of a sensor 21, wherein an engine control device 22 compares this $NO_2$ exhaust gas actual value with an $NO_2$ exhaust gas set point value and dependent on this changes at least one operating parameter for the gas engine 11 so that the $NO_2$ exhaust gas actual value is approximated to the $NO_2$ exhaust gas set point value. The engine control device 22 in this case determines the $NO_2$ exhaust gas set point value preferentially as a function of at least one operating parameter of the gas engine 11, preferentially dependent on the load point.

According to the version of FIG. 4 it is accordingly proposed by changing at least one operating parameter for the gas engine 11 of the internal combustion engine 10 to adjust the $NO_2$ proportion in the exhaust gas 15 upstream of the $CH_4$-oxidation catalytic converter 18 in a defined manner in order to thereby make possible an optimum conversion of $CH_4$ in the $CH_4$ catalytic converter 18.

The operating parameter for the gas engine 11, on the basis of which a change of the $NO_2$ proportion in the exhaust gas 15 is to be adjusted in a defined manner in this case is determined in the sense of a regulation as a regulatory control variable based on a set point-actual value comparison, wherein the actual value is an $NO_2$ exhaust gas actual value and the set point value an $NO_2$ exhaust gas set point value. The $NO_2$ exhaust gas set point value is automatically determined by the engine control device 22 dependent on the operating point, in particular dependent on the load point, wherein the control device 22 as control variable and accordingly as operating parameter for the engine, preferentially changes the lambda value, and/or the ignition timing, and/or valve control times, and/or the engine compression and/or the exhaust gas proportion in the engine combustion chamber in order to approximate the $NO_2$ actual value to the $NO_2$ set point value.

Figure 5:
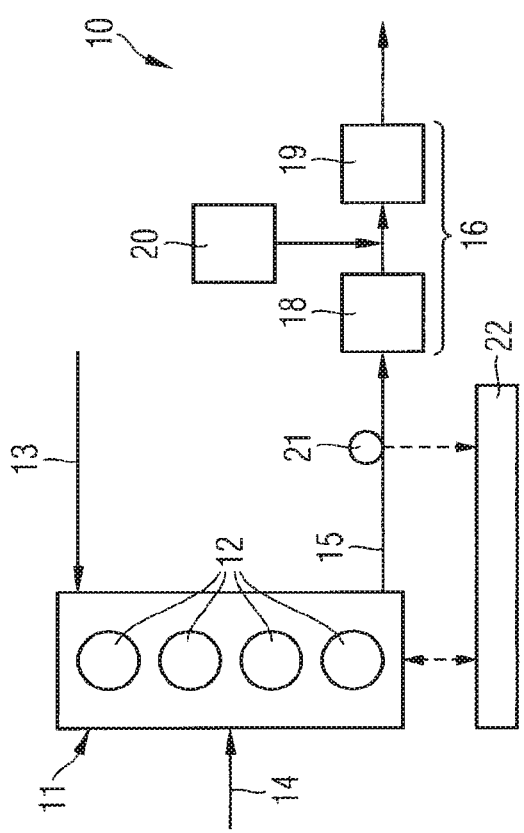
FIG. 5: is a schematic representation of an internal combustion engine according to the invention.

FIG. 5 shows a further development of the exemplary embodiment of FIG. 4, in which downstream of the $CH_4$-oxidation catalytic converter 18 an SCR-catalytic converter 19 is positioned, to convert in the same nitrogen oxides using a reduction agent, which is introduced via device 20 into the exhaust gas upstream of the SCR-catalytic converter 19, namely in accordance with the exemplary embodiment of FIG. 2, 3. With respect to the details of the SCR-catalytic converter 19 and of the reduction agent, reference is made to the above explanations.

Figure 6:
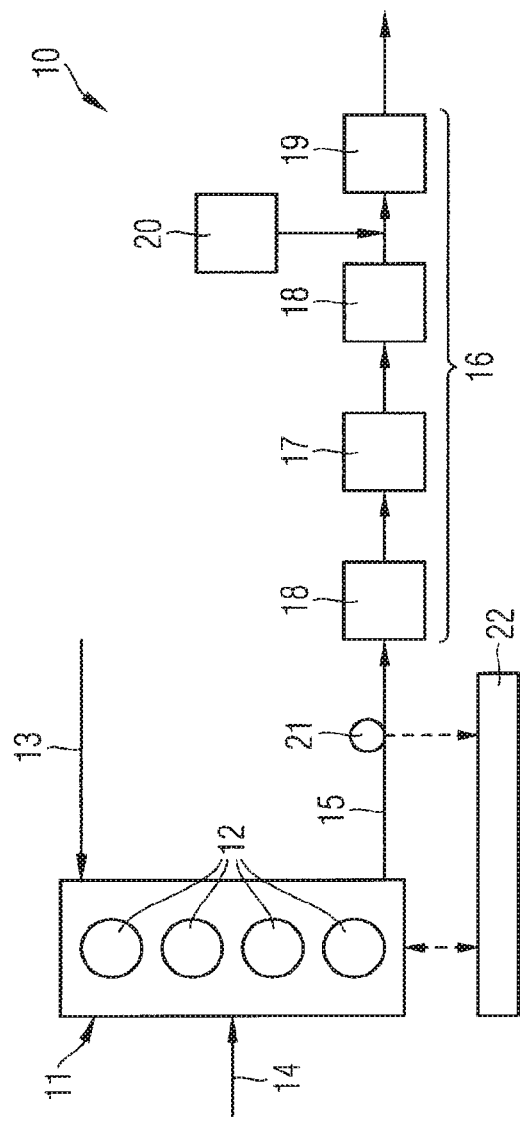
FIG. 6: is a schematic representation of an internal combustion engine according to the invention.

A further development of the internal combustion engine according to FIG. 5 is shown by FIG. 6, wherein in FIG. 6 an internal combustion engine 10 is shown that uses both measures on the gas engine side and also measures on the exhaust gas aftertreatment system side to adjust the $NO_2$ proportion in the exhaust gas 15. Accordingly, with the internal combustion engine of FIG. 6, the $NO_2$ proportion in the exhaust gas 15 is adjusted in the exhaust gas 15 upstream of the first $CH_4$-oxidation catalytic converter 18 via a measure on the gas engine side, as described in connection with FIG. 5, the adjustment of the $NO_2$ proportion in the exhaust gas 15 upstream of the second $CH_4$-oxidation catalytic converter 18 takes place with the help of a measure on the exhaust gas aftertreatment system side of an NO-oxidation catalytic converter 17, which is positioned between the two $CH_4$-oxidation catalytic converters 18. With respect to the details of the NO-oxidation catalytic converter 17, reference is made to the explanations regarding the exemplary embodiments of FIGS. 1 to 3.

Further exemplary embodiments of internal combustion engines 10 according to the invention are shown by FIGS. 7 to 10, wherein the exemplary embodiments of FIGS. 7 to 10 differ from the exemplary embodiments of FIGS. 1 to 6 in that the gas engine 11 is designed as an exhaust gas supercharged or turbocharged gas engine 11, i.e. which is assigned an exhaust gas turbocharger 25 with a turbine 23 and a compressor 24.

In the turbine 23 of the exhaust gas turbocharger 25, exhaust gas 15, which leaves the gas engine 11, can be expanded in order to extract energy in the process, which is utilised for driving the compressor 24 of the exhaust gas turbocharger 25, wherein in the compressor 24 combustion air 13 to be fed to the cylinders 11 is compressed.

Figure 7:
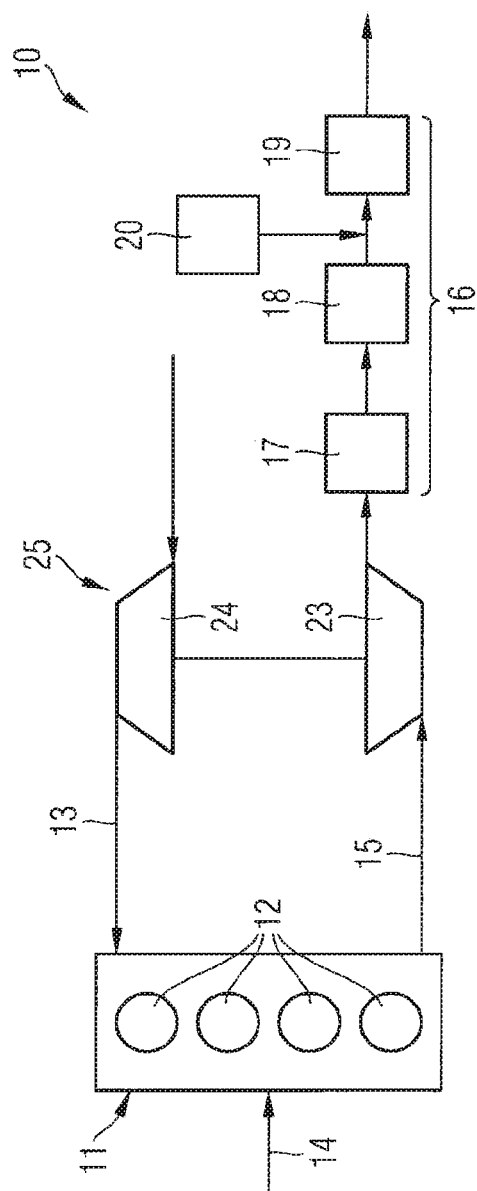
FIG. 7: is a schematic representation of an internal combustion engine according to the invention.

Accordingly, the exemplary embodiment of FIG. 7 substantially corresponds to the exemplary embodiment of FIG. 2 with the difference that the exhaust gas 15 upstream of the NO-oxidation catalytic converter 17 is conducted via the turbine 23 of the exhaust gas turbocharger 25.

Figure 8:
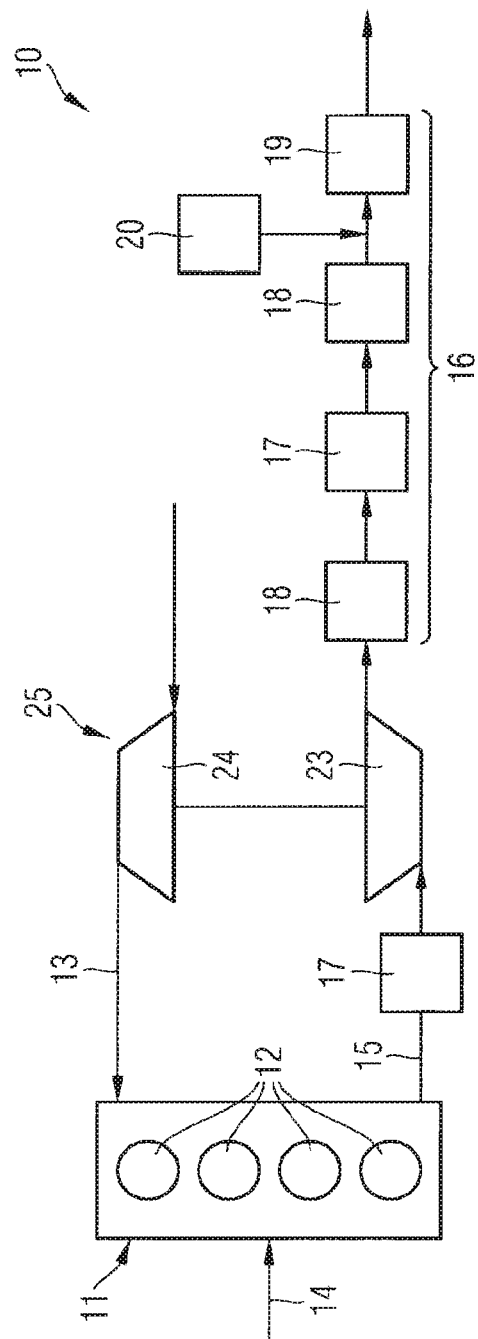
FIG. 8: is a schematic representation of an internal combustion engine according to the invention.

The exemplary embodiment of FIG. 8 substantially corresponds to the exemplary embodiment of FIG. 3, however again with the difference that the gas engine 11 is assigned the exhaust gas turbocharger 25. The NO-oxidation catalytic converter 17, which is arranged upstream of the first $CH_4$-oxidation catalytic converter 18, is arranged upstream of the turbine of the exhaust gas turbocharger 25 so that accordingly exhaust gas 15 which leaves the cylinders 12 of the gas engine 11 is initially conducted via the first NO-oxidation catalytic converter 17 and only subsequently via the turbine 23 of the exhaust gas turbocharger 25.

Figure 9:
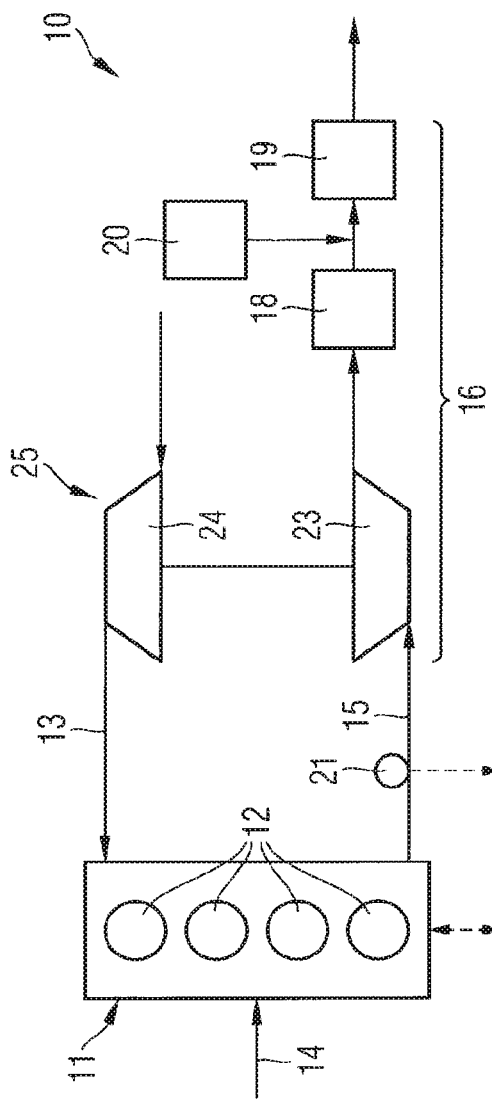
FIG. 9: is a schematic representation of an internal combustion engine according to the invention.

The exemplary embodiment of FIG. 9 substantially corresponds to the exemplary embodiment of FIG. 5, however again with the difference that the gas engine 11 is assigned an exhaust gas turbocharger 25.

The exhaust gas 15, the $NO_2$ proportion of which is adjusted in FIG. 9 via an intervention on the gas engine side, is initially conducted via the turbine 23 of the exhaust gas turbocharger 25, before the same is conducted via the $CH_4$-oxidation catalytic converter 18.

Figure 10:
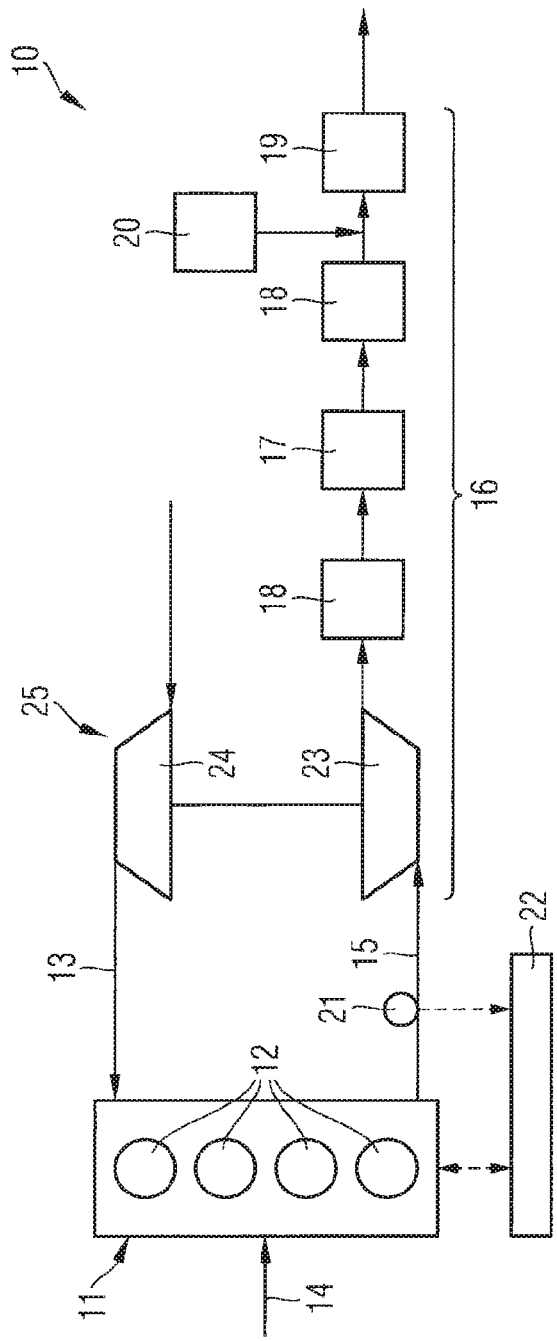
FIG. 10: is a schematic representation of an internal combustion engine according to the invention.

The exemplary embodiment of FIG. 10 substantially corresponds to the exemplary embodiment of FIG. 6, however again using an exhaust gas turbocharger 25.

With the internal combustion engines according to the invention and the methods for operating the same described above, $CH_4$ emissions can be advantageously reduced on internal combustion engines preferentially operated with natural gas. Accordingly, the $NO_2$ proportion in the exhaust gas upstream of at least one $CH_4$-oxidation catalytic converter is adjusted in a defined manner via at least one measure on the gas engine side and/or via at least one measure on the exhaust gas system side in order to thus ensure an optimum $CH_4$ decomposition.

The invention claimed is:

1. A method for operating an internal combustion engine, having a gas combustion system and an exhaust gas aftertreatment system, comprising:
   conducting an exhaust gas, which leaves the gas combustion system, via the exhaust gas aftertreatment system having at least one $CH_4$-oxidation catalytic converter for cleaning;
   determining an actual $NO_2$ exhaust gas value based at least in part on a measured value;
   measuring a $CH_4/NO_2$ mole ratio in the exhaust gas at least one of on a gas combustion system side and on an exhaust gas aftertreatment system side upstream of the at least one $CH_4$-oxidation catalytic converter;
   adjusting a $CH_4/NO_2$ mole ratio in the exhaust gas based at least in part on the measurement to be less than or equal to 2.

2. The method according to claim 1, further comprising:
   adjusting an $NO_2$ proportion in the exhaust gas is adjusted so that upstream of the at least one $CH_4$-oxidation catalytic converter the $NO_2$ proportion of a total nitrogen oxides in the exhaust gas amounts to at least one of:
   at least 15%,
   at least 30%, and
   at least 50%.

3. The method according to claim 2, wherein the $NO_2$ proportion in the exhaust gas is adjusted via at least one NO-oxidation catalytic converter of the exhaust gas aftertreatment system, which is arranged upstream of the at least one $CH_4$-oxidation catalytic converter.

4. The method according to claim 3, wherein the exhaust gas is conducted via a plurality of $CH_4$-oxidation catalytic converters which are positioned one after the other and upstream of at least one $CH_4$-oxidation catalytic converters via at least one NO— oxidation catalytic converter.

5. The method according to claim 2, wherein the $NO_2$ proportion in the exhaust gas is adjusted by changing at least one operating parameter for the gas combustion system.

6. The method according to claim 5, wherein the at least one operating parameter comprises at least one of a lambda value, an ignition timing, valve control times, an engine compression, and an exhaust gas proportion in an engine combustion chamber.

7. The method according to claim 5, further comprising:
   changing the at least one operating parameter for the gas combustion system such that the actual $NO_2$ exhaust gas value is approximated to an $NO_2$ exhaust gas set point value.

8. The method according to claim 1, further comprising:
   conducting the exhaust gas upstream of the at least one $CH_4$-oxidation catalytic converter is conducted via an SCR-catalytic converter; and
   introducing at least one of $NH_3$ or an $NH_3$ precursor substance in the exhaust gas downstream of the SCR-catalytic converter.

9. An internal combustion engine, comprising:
   a gas combustion system;
   a sensor configured to measure an actual $NO_2$ exhaust gas value, and
   an exhaust gas aftertreatment system, that comprises at least one $CH_4$-oxidation catalytic converter,
   wherein an $NO_2$ proportion in the exhaust gas is adjusted in a defined manner by at least one of:
   at least one measure on a gas combustion system side and at least one measure on an exhaust gas aftertreatment system side; and an engine control device configured to receive a measured a $CH_4/NO_2$ mole ratio in the exhaust gas and adjusting a $CH_4/NO_2$ mole ratio in the exhaust gas to be less than or equal to 2 based at least in part on the received measurement.

10. The internal combustion engine according to claim 9, further comprising:

an NO-oxidation catalytic converter arranged upstream of the at least one $CH_4$-oxidation catalytic converter.

11. The internal combustion engine according to claim 10, wherein the exhaust gas aftertreatment system comprises a plurality of $CH_4$-oxidation catalytic converters connected one behind the other, wherein upstream of at least one of the plurality of $CH_4$-oxidation catalytic converters at least one NO-oxidation catalytic converter is arranged.

12. The internal combustion engine according to claim 10, further comprising:

an exhaust gas turbocharger, wherein at least one NO-oxidation catalytic converter is positioned upstream of a turbine of the exhaust gas turbocharger.

13. The internal combustion engine according to claim 9, further comprising:

an SCR-catalytic converter arranged downstream of the at least one $CH_4$-oxidation catalytic converter; and a device positioned upstream of the SCR-catalytic converter and configured to introduce at last one of $NH_3$ and an $NH_3$ precursor substance into the exhaust gas.

14. The internal combustion engine according to claim 9, wherein the sensor configured to determine an actual $NO_2$ exhaust gas value is at least one of downstream of the gas combustion system and upstream of the exhaust gas aftertreatment system; and the engine control device further configured to change at least one operating parameter for the gas combustion system such that the actual $NO_2$ exhaust gas value is approximated to an $NO_2$ exhaust gas set point value.

15. The internal combustion engine according to claim 14, wherein the engine control device determines the $NO_2$ exhaust gas set point value as a function of at least one operating parameter of the gas combustion system.

16. The method according to any one of the claim 1, wherein the $CH_4/NO_2$ mole ratio in the exhaust gas is smaller than 1.5.

17. The method according to any one of the claim 1, wherein the $CH_4/NO_2$ mole ratio in the exhaust gas is smaller than 1.

18. The internal combustion engine according to claim 14, wherein the engine control device determines the $NO_2$ exhaust gas set point value based at least in part on a load point.

19. The internal combustion engine according to claim 9, wherein the received $CH_4/NO_2$ mole ratio in the exhaust gas is from at least one of on a gas combustion system side and on an exhaust gas aftertreatment system side upstream of the at least one $CH_4$-oxidation catalytic converter.

* * * * *